United States Patent
Oschmann et al.

(10) Patent No.: US 8,911,317 B2
(45) Date of Patent: Dec. 16, 2014

(54) POWER SPLIT TRANSMISSION

(71) Applicant: Robert Bosch GmbH, Stuttgart (DE)

(72) Inventors: Sebastian Oschmann, Nersingen (DE); Florian Muehlbauer, Neu-Ulm (DE); Matthias Mueller, Langenau (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 13/682,810

(22) Filed: Nov. 21, 2012

(65) Prior Publication Data

US 2013/0137542 A1 May 30, 2013

(30) Foreign Application Priority Data

Nov. 25, 2011 (DE) .......................... 10 2011 119 429

(51) Int. Cl.
*F16H 47/04* (2006.01)
*F16H 61/4096* (2010.01)
*F16H 37/08* (2006.01)

(52) U.S. Cl.
CPC ............ *F16H 47/04* (2013.01); *F16H 61/4096* (2013.01); *F16H 2037/088* (2013.01)
USPC ........................................................ 475/72

(58) Field of Classification Search
CPC ....................................................... F16H 47/04
USPC ........................................................... 475/72
See application file for complete search history.

(56) References Cited

U.S. PATENT DOCUMENTS

| 4,313,351 | A * | 2/1982 | Hagin ............................. 475/80 |
| 2009/0036248 | A1 * | 2/2009 | Mueller et al. .................. 475/72 |
| 2010/0298081 | A1 * | 11/2010 | Ivanysynova et al. .......... 475/72 |

FOREIGN PATENT DOCUMENTS

| DE | 10 2007 012 116 A1 | 9/2007 |
| DE | 10 2009 031 382 A1 | 1/2011 |

\* cited by examiner

*Primary Examiner* — Edwin A Young
(74) *Attorney, Agent, or Firm* — Maginot, Moore & Beck LLP

(57) ABSTRACT

A power split transmission, in particular an input-coupled power split transmission, includes a mechanical branch and a hydrostatic branch connected in parallel therewith. The hydrostatic branch has a closed hydraulic circuit with a first working line and a second working line with one of the working lines carrying high pressure and the other carrying low pressure. The circuit has a pressure accumulator for pressure regulation connected to the respective working line carrying high pressure. This configuration provides a power split transmission that has a hydraulic circuit in which the respective working line carrying high pressure is hydraulically smoother or more flexible by virtue of the preferably continuous connection of the pressure accumulator.

17 Claims, 2 Drawing Sheets

POWER SPLIT TRANSMISSION

This application claims priority under 35 U.S.C. §119 to patent application no. DE 10 2011 119 429.4, filed on Nov. 25, 2011 in Germany, the disclosure of which is incorporated herein by reference in its entirety.

BACKGROUND

The disclosure relates to a power split transmission.

In the case of power split transmissions which have a mechanical branch and a hydrostatic branch, the practice of arranging a hydraulic accumulator in the hydrostatic branch is known.

In printed publication DE 10 2007 012 116 A1, a power split transmission of this kind is shown with a hydraulic circuit, to which a hydraulic accumulator is connected. This is used for energy recovery.

For pressure regulation, pump pressure control valves and pressure limiting valves are provided on the working lines in the hydrostatic branch of power split transmissions in the prior art. However, pump pressure control valves are not suitable where there are different pivoting directions of the pump. Pressure limiting valves produce waste heat, and thermal control of the latter can be difficult.

It is the underlying object of the disclosure to provide a power split transmission having a hydrostatic branch, the regulation of which allows secondary control and avoids the abovementioned disadvantages.

This object is achieved by a power split transmission with an accumulator having the features of the disclosure.

SUMMARY

The power split transmission according to the disclosure—which is preferably an input-coupled power split transmission—has a mechanical branch and a hydrostatic branch connected in parallel therewith, which has a closed hydraulic circuit with a first working line and a second working line, of which one carries high pressure and the other carries low pressure in normal operation. In this arrangement, the circuit has a pressure accumulator for pressure regulation, and this pressure accumulator can be connected to the respective working line carrying high pressure. This provides a power split transmission having a hydrostatic branch in which the respective working line carrying high pressure is hydraulically smoother or more flexible by virtue of the connection of the pressure accumulator, with the result that the controlled system is less dynamic and secondary control is possible. The pressure accumulator is preferably connected continuously to the working line carrying high pressure.

Further advantageous embodiments of the disclosure are described in the dependent patent claims.

The hydrostatic branch preferably has a variable hydraulic pump—in particular a variable hydraulic pump capable of electroproportional adjustment—and a variable hydraulic motor—in particular a variable hydraulic motor capable of electroproportional adjustment.

The mechanical branch can have a planetary transmission. By means of the planetary transmission, the power from the two branches can be combined.

In a preferred embodiment of the input coupling of the two branches, the hydraulic pump is coupled mechanically—in particular by means of gearwheels—to a sun wheel of the planetary transmission.

To combine the two power flows from the two branches, the hydraulic motor can be coupled mechanically—in particular by means of meshing teeth—to an annulus of the planetary transmission.

In a first preferred variant, the pressure accumulator is connected to the first working line by means of a first 2/2-way switching valve and to the second working line by means of a second 2/2-way switching valve. In this arrangement, both valves are isolator valves, by means of which the respective working line carrying high pressure can be connected to the pressure accumulator while the working line carrying low pressure is isolated from the pressure accumulator.

In a second preferred variant, the pressure accumulator can be connected to the respective working line carrying high pressure by means of a common 3/2-way switching valve. The 3/2-way switching valve has two defined operating positions. In the first operating position, the pressure accumulator is connected to the first working line and the connection to the second working line is shut off. In the second operating position, the pressure accumulator is connected to the second working line and the connection to the first working line is shut off.

In a third preferred variant, the pressure accumulator can be connected to the respective working line carrying high pressure by means of a common 3/3-way switching valve. In addition to the two operating positions mentioned in connection with the 3/2-way switching valve, the 3/3-way switching valve has a home position, in which all the connections between the pressure accumulator and the working lines are shut off.

In a preferred development, the hydraulic motor has a control pressure port, which is connected to the first working line and to the second working line and to the pressure accumulator by means of respective check valves opening toward the control pressure port. Thus, during normal operation, control pressure medium from the working line carrying high pressure is available or, during a changeover of the high pressure side, control pressure medium from the pressure accumulator is available. An uninterrupted supply of control pressure medium at high pressure to the hydraulic motor is thus ensured.

A preferred development of the power split transmission according to the disclosure has various selectable transmission ratios or gears. During the selection of these gears, changes in the torque can arise at the hydraulic machines of the hydrostatic branch, leading to a changeover of the high pressure from one working line to the other. This changeover can be accelerated by switching over the connection of the pressure accumulator from one working line to the other.

For volume compensation, the hydrostatic branch can have a second pressure accumulator, which can be connected to the working line carrying low pressure.

BRIEF DESCRIPTION OF THE DRAWINGS

Various illustrative embodiments of the disclosure are described in detail below with reference to the figures, of which.

DETAILED DESCRIPTION

Figure 1:
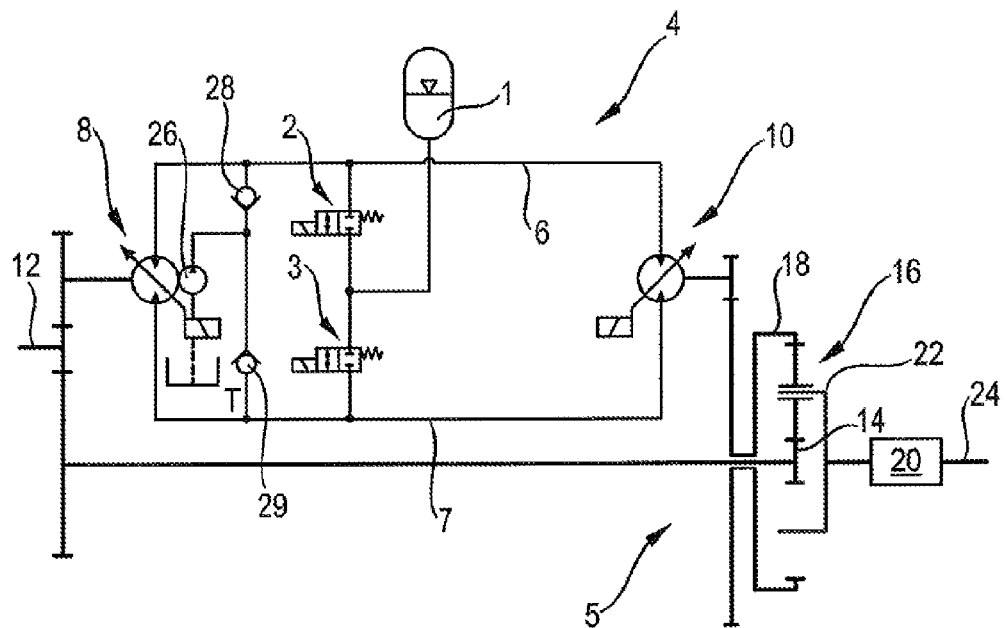
FIG. 1 shows a circuit diagram of a first illustrative embodiment of a power split transmission according to the disclosure.

FIG. 1 shows a circuit diagram of a first illustrative embodiment of a power split transmission according to the disclosure. It has a hydrostatic branch 4 and a mechanical branch 5. The hydrostatic branch 4 has a first working line 6 and a second working line 7, into which pressure medium can be alternately delivered by a fully pivotable variable displacement pump 8. Via the corresponding working line 6, 7, a variable displacement hydraulic motor 10 is supplied with pressure medium. The hydrostatic branch 4 is designed as a closed hydraulic circuit, in which the variable displacement pump 8 is driven by an input shaft 12 via a gear stage. A sun wheel 14 of the planetary transmission 16 is driven by the input shaft 12—likewise via a gear stage. The hydrostatic branch 4 and the mechanical branch 5 are input-coupled by the common input shaft 12 and the two gear stages.

A planet carrier 22 is driven by the variable displacement motor 10 of the hydrostatic branch 4 via a gear stage and an annulus 18 of the planetary transmission 16. The planet carrier 22 is also driven via the sun wheel 14 of the planetary transmission 16. The "outputs" of the hydrostatic branch 4 and of the mechanical branch 5 and the power flows thereof are thus combined in the planetary transmission 16. Finally, the output torque and the rotational speed of the shaft of the planet carrier are converted in a transmission 20, which is arranged in the power flow between the planet carrier 22 of the planetary transmission 16 and an output shaft 24. Instead of the transmission 20 or in addition thereto, a multi-stage transmission of the kind shown in DE 10 2009 031 382 A1, for example, can be arranged in the mechanical power branch between the input coupling and the planetary stage 16, i.e. between the corresponding gear stage arranged at the input and the sun wheel 14 of the planetary stage. If the power split transmission according to the disclosure is installed in a travel drive, the input shaft 12 is driven by an internal combustion engine (not shown), while the output shaft 24 drives one or more wheels.

The closed circuit of the hydrostatic branch 4 has a feed pump 26, which is likewise driven via the input shaft 12 and draws in replacement pressure medium for the closed circuit when required from a tank T. The feed pump 26 is connected to the first working line 6 via a first check valve 28 and to the second working line 7 via a second check valve 29. The replacement pressure medium supplied by the feed pump 26 can thus be delivered to the respective working line 6, 7 carrying low pressure when required.

According to the disclosure, a pressure accumulator 1 is connected in the first illustrative embodiment to the first working line 6 by means of a first 2/2-way switching valve 2, while the pressure accumulator 1 is connected to the second working line 7 by means of a second 2/2-way switching valve 3. In a spring-loaded home position, the two 2/2-way switching valves 2, 3 are each closed, while they are fully open in an operating position.

According to the disclosure, the 2/2-way switching valve 2, 3 assigned to the working line 6, 7 that is carrying high pressure at the particular time under consideration is open. This depends, in particular, on the desired direction of rotation of the annulus 18 and on whether the hydrostatic branch 4 is supposed to accelerate or retard the rotation of the annulus 18.

Figure 2:
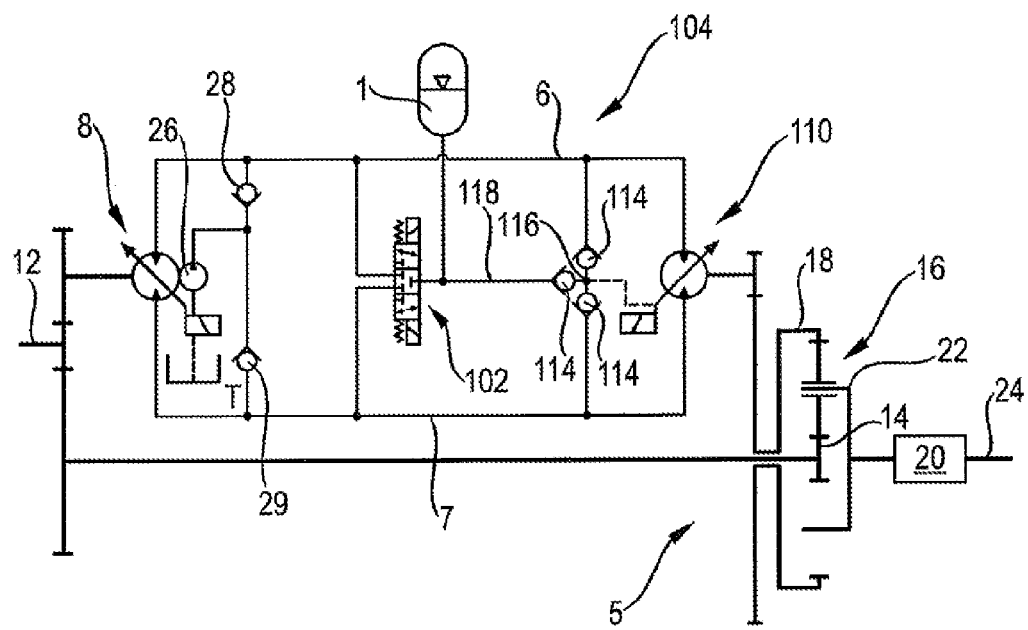
FIG. 2 shows a circuit diagram of a second illustrative embodiment of a power split transmission according to the disclosure.

FIG. 2 shows a circuit diagram of a second illustrative embodiment of a power split transmission according to the disclosure. The power splitting in the region of the common input shaft 12 and the combination of the power in the region of the planetary transmission 16, transmission 20 and the common output shaft 24 correspond to those in the first illustrative embodiment shown in FIG. 1.

A hydrostatic branch 104 contains the variable displacement pump 8 and the two working lines 6, 7 as in the first illustrative embodiment. A variable displacement motor 110 has a modified control oil supply as compared with the first illustrative embodiment. Apart from the respective supply from the working line 6, 7 carrying high pressure, there is the additional possibility in this case of making available control pressure medium directly from the pressure accumulator 1 via a third check valve 114. This occurs, for example, when the high pressure switches over from one working line 6, 7 into the other working line 6, 7, and the control pressure medium supply to the variable displacement motor 110 is therefore briefly reduced. The control pressure medium supply is achieved via a junction 116, which is connected to a control pressure port of the variable displacement motor 110. The junction 116 is connected by a first branch line to the first working line 6 and by a second branch line to the second working line 7. The junction 116 is furthermore connected by a third branch line 118 to the pressure accumulator 1. Respective check valves 114 opening toward the junction 116 and hence toward the control pressure port of the variable displacement motor 110 are arranged in all three branch lines.

Moreover, in the second illustrative embodiment shown in FIG. 2 a common 3/3-way switching valve 102 is provided instead of the two 2/2-way switching valves. In a central home position of a valve slide (not shown specifically), which is preloaded by two springs, the pressure accumulator 1 is isolated from both working lines 6, 7. In a first operating position, the pressure accumulator 1 is connected to the first working line 6 by a branch line, while the connection of the pressure accumulator 1 to the second working line 7 is shut off. In a second operating position, the pressure accumulator 1 is connected to the second working line 7 by a second branch line, while the pressure accumulator 1 is isolated from the first working line 6.

In both illustrative embodiments, the dimensioning of the pressure accumulator 1 takes account of the pivoting dynamics of the variable displacement pump 8, of the required dynamics in the pressure buildup in the working lines 6, 7, the volume necessary to fill the working lines 6, 7, the pressure buildup during the pressure transition, and the control pressure supply to the variable displacement motor 110. The pressure accumulator 1 can have a volume of about one liter, for example.

The power split transmission according to the disclosure ensures a constant output torque even in the case of a pressure transition in the two working lines 6, 7 due to a change of driving range. By switching both 2/2-way switching valves 2, 3 of the first illustrative embodiment or by moving the 3/3-way switching valve 102 of the second illustrative embodiment from one operating position to the other, the high pressure can be allocated quickly and proactively to the new high pressure line 6, 7. This leads to a defined pressure transition.

According to the disclosure, the inflexibility of the controlled system is reduced by the pressure accumulator 1, thereby improving the controllability of the system pressure.

Moreover, the power split transmission according to the disclosure allows secondary control and torque-based driving strategies, which are advantageous especially in the case of hybrid vehicles. In this case, it is possible for the adjustment angle of the variable displacement motor 10, 110 to be used in accordance with the system pressure of the respective working line 6, 7 to make available a torque at the annulus 18 of the planetary transmission 16 which is directly proportional to the output torque at the output shaft 24. Here, the variable displacement pump 8 controls the system pressure in the respective working line 6, 7 by removing pressure medium from or feeding pressure medium to the working line 6, 7 carrying high pressure.

The option of supplying control pressure to the variable displacement motor 110 via the three check valves 114 can also be provided in the first illustrative embodiment shown in FIG. 1.

Figure 3:
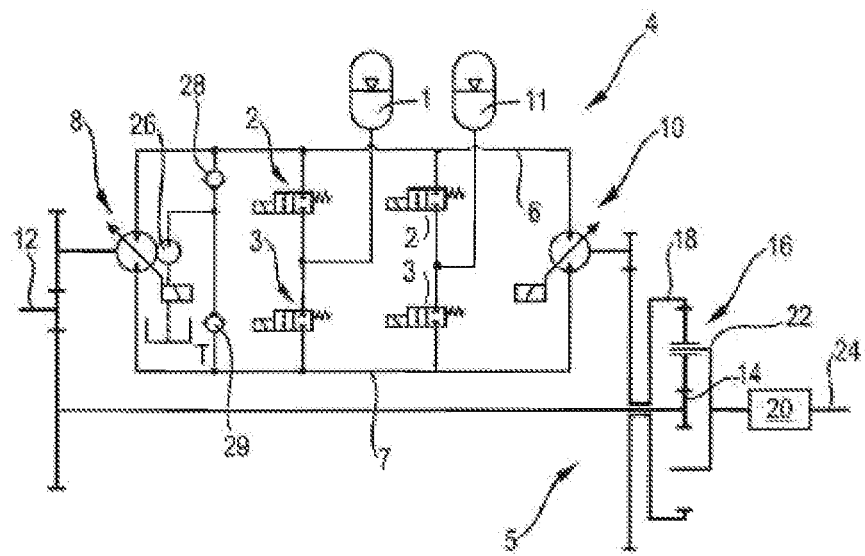
FIG. 3 shows a circuit diagram of a third illustrative embodiment of a power split transmission according to the disclosure.
Figure 4:
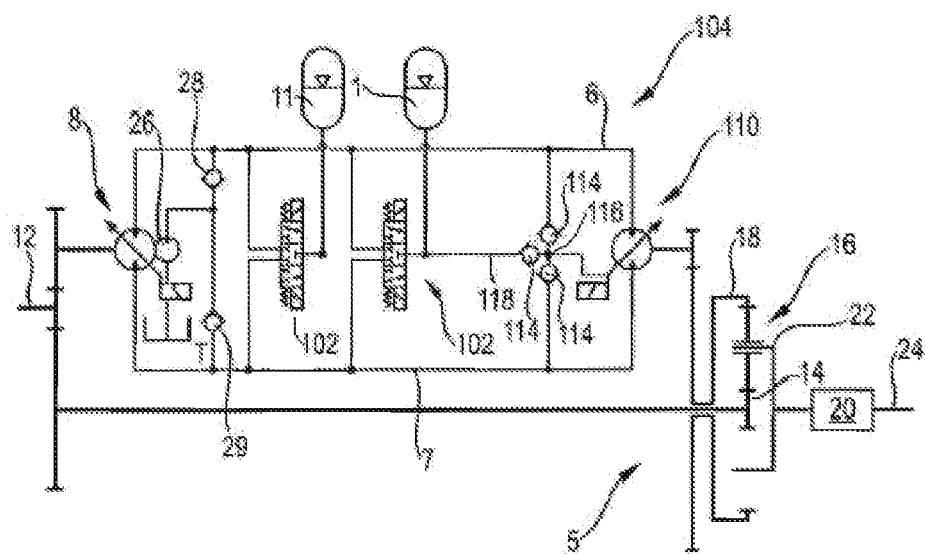
FIG. 4 shows a circuit diagram of a fourth illustrative embodiment of a power split transmission according to the disclosure.

As a departure from the illustrative embodiments shown in FIGS. 1 and 2, a further pressure accumulator 11 can be provided, said accumulator being connected to the two working lines 6, 7 by means of two 2/2-way switching valves 2, 3, as shown in FIG. 3, or by means of a 3/3-way switching valve 102, as shown in FIG. 4. This further pressure accumulator 11 is used to compensate for the volume of the pressure medium discharged into the first pressure accumulator 1 or fed in from the pressure accumulator 1.

A disclosure is made of a power split transmission—preferably an input-coupled power split transmission—having a mechanical branch and a hydrostatic branch connected in parallel therewith, which has a closed hydraulic circuit with a first working line and a second working line. In normal operation, one of the working lines carries high pressure and the other carries low pressure. In this arrangement, the circuit has a pressure accumulator for pressure regulation, and this pressure accumulator can be connected to the respective working line carrying high pressure. This provides a power split transmission having a hydraulic circuit in which the respective working line carrying high pressure is hydraulically smoother or more flexible by virtue of the—preferably continuous—connection of the pressure accumulator.

What is claimed is:

1. A power split transmission, comprising:
   a mechanical branch; and
   a hydrostatic branch connected in parallel with the mechanical branch, the hydrostatic branch having a closed hydraulic circuit with a first working line and a second working line and with a pressure accumulator,
   wherein, to regulate pressure, the pressure accumulator is continuously connected, via a valve arrangement, to the first working line when the first working line is carrying high pressure, and to the second working line when the second working line is carrying high pressure.

2. The power split transmission according to claim 1, wherein the hydrostatic branch has a variable displacement pump and a variable displacement motor.

3. The power split transmission according to claim 2, wherein the mechanical branch has a planetary transmission, and wherein the variable displacement pump is coupled mechanically to a sun wheel of the planetary transmission.

4. The power split transmission according to claim 2, wherein the mechanical branch has a planetary transmission, and wherein the variable displacement motor is coupled mechanically to an annulus of the planetary transmission.

5. The power split transmission according to claim 1, wherein the mechanical branch has a planetary transmission.

6. The power split transmission according to claim 1, wherein the valve arrangement includes a first 2/2-way switching valve configured to connect the pressure accumulator to the first working line, and a second 2/2-way switching valve configured to connect the pressure accumulator to the second working line.

7. The power split transmission according to claim 1, wherein the valve arrangement includes a 3/2-way switching valve or by a 3/3-way switching valve configured to connect the pressure accumulator to the first working line and the second working line.

8. The power split transmission according to claim 1, further comprising a transmission.

9. The power split transmission according to claim 1, wherein the hydrostatic branch has a second pressure accumulator configured to be connected or is connected to the working line carrying low pressure.

10. A power split transmission comprising:
    a mechanical branch; and
    a hydrostatic branch connected in parallel with the mechanical branch, the hydrostatic branch having a closed hydraulic circuit with a first working line and a second working line and with a pressure accumulator,
    wherein the pressure accumulator is configured to be connected to the respective working line carrying high pressure to regulate pressure;
    wherein the hydrostatic branch has a variable displacement pump and a variable displacement motor; and
    wherein the variable displacement motor has a control pressure port connected to the first working line and to the second working line and to the pressure accumulator by respective check valves opening toward the control pressure port.

11. The power split transmission according to claim 10, wherein the mechanical branch has a planetary transmission.

12. The power split transmission according to claim 10, wherein the mechanical branch has a planetary transmission, and wherein the variable displacement pump is coupled mechanically to a sun wheel of the planetary transmission.

13. The power split transmission according to claim 10, wherein the mechanical branch has a planetary transmission, and wherein the variable displacement motor is coupled mechanically to an annulus of the planetary transmission.

14. The power split transmission according to claim 10, wherein the pressure accumulator is configured to be connected to the first working line by a first 2/2-way switching valve and to the second working line by a second 2/2-way switching valve.

15. The power split transmission according to claim 10, wherein the pressure accumulator is configured to be connected to the respective working line carrying high pressure by a 3/2-way switching valve or by a 3/3-way switching valve.

16. The power split transmission according to claim 10, further comprising a transmission.

17. The power split transmission according to claim 10, wherein the hydrostatic branch has a second pressure accumulator configured to be connected or is connected to the working line carrying low pressure.

\* \* \* \* \*